United States Patent Office 3,692,615
Patented Sept. 19, 1972

3,692,615
APPARATUS FOR FORMING LONGITUDINAL CORRUGATIONS IN SHEET MATERIAL
Koichiro Ohmori, 1421, 2-chome, Matsugaoka, Kugenuma, Fujisawa, Japan
Filed Mar. 12, 1970, Ser. No. 19,032
Int. Cl. B31f 1/20
U.S. Cl. 425—370        8 Claims

ABSTRACT OF THE DISCLOSURE

There is disclosed an apparatus for forming longitudinal corrugations in the web of sheet material, comprising a generally curved, rigid and elongated guide bed having an inlet end and an outlet end each disposed perpendicular to the direction of the sheet travel, a plurality of flutes extending between said outlet and inlet ends of the bed and having alternate ridges and grooves, said flutes converging toward said outlet end becoming progressively greater in amplitude and smaller in period, the guide surface containing said ridges and grooves of the flutes has a geometry such that the longitudinal surface lengths of the sheet material measured with a certain surface distance from the longitudinal side edges of the bed and transverse wavy surface lengths of the sheet material measured with a certain surface distance from the inlet or outlet end of the bed are held substantially equal, respectively, at any portion of the bed.

---

This invention relates to an improved and useful apparatus for forming longitudinal corrugations in sheet material.

The apparatus according to the invention provides a means which may conveniently be called as "guide bed" or "gathering bed" whereby longitudinal corrugations may be formed in sheet material, as in a paper web which is intended for use in the manufacture of corrugated paper board.

The inventor devised and disclosed in Japanese patent application No. 37/23,495 filed June 6, 1962, a means which may be called "gathering bed" and which has a plurality of longitudinal converging fluted surface for gathering sheet material into fluted configurations thereon, said bed being longitudinally curved along fluted surface. Similar gathering or guide bed is described in U.S. Pat. No. 3,425,888 to Keith Q. Kellicutt, dated Feb. 4, 1969. According to this patent, there is described a means for producing corrugated products by drawing a continuous length of sheet material to be corrugated between a plurality of wheel rollers and a gathering bed that has also a longitudinally converging fluted surface, the amplitude and period of the flutes becoming progressively greater and smaller, respectively.

With these conventional gathering beds, however, the flutes are formed on a horizontal plane or longitudinally curved plane with the result that the lengths of flutes become longer in the side portions than in the axial portions of the bed. Therefore, even if the elasticity of the sheet material to be corrugated be taken into consideration, it has been difficult to gather the sheet without causing locally biased stresses to the sheet material, especially when the sheet has a relatively large width.

It is therefore the main object of the intsant invention to provide an improved guide means for forming corrugations in the web of sheet material of any width longitudinally or parallel with the machine direction on a guide surface specially designed for such purpose.

A furher object of this invention is to provide an apparatus for forming corrugations in a paper web which is used in the manufacture of corrugated paper board.

Still another object of this invention is to provide an apparatus for forming continuous longitudinal corrugations in sheet material without the danger of the sheet material being torn during the formation of the corrugations therein.

A still further object of this invention is to provide an apparatus for forming longitudinal corrugations continuously in sheet material which may be adapted conveniently economically in the conventional form of manufacture, and which is simple in construction and easy to use.

These together with other objects and advantages of the invention will be apparent from the following detailed description and the appended claims, reference being had to the accompanying drawings forming a part hereof, wherein like numerals refer to like parts throughout, and in which:

Figure 2:
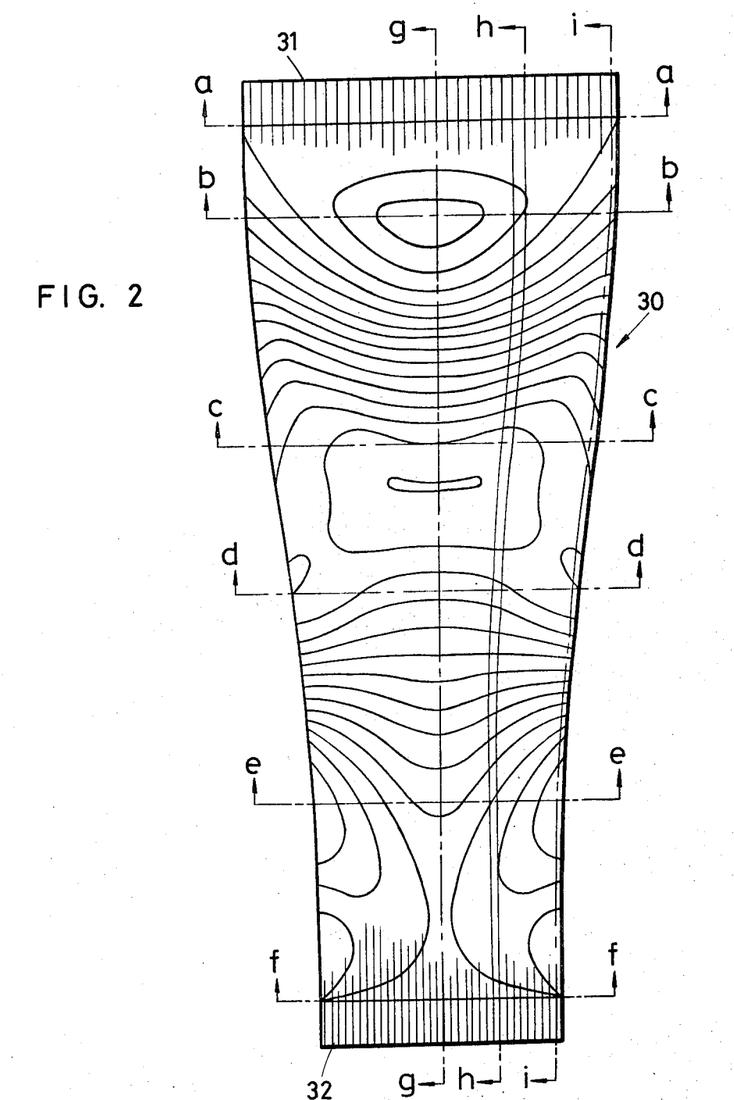
FIG. 2 is a diagrammatic plane view of the guide bed according to the present invention, showing fundamental contours of the guide surface of the bed.
Figure 3G:
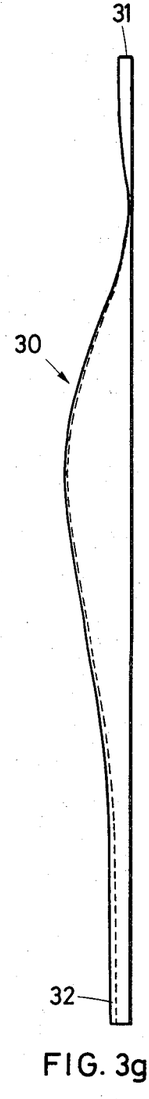
FIGS. 3g, 3h and 3i are sections taken along section lines g—g, h—h and i—i, respectively, of FIG. 2.
Figure 3H:
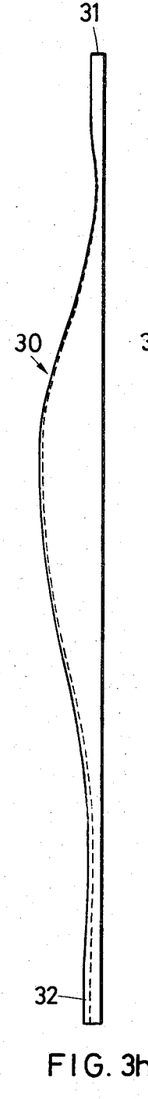
Figure 3I:
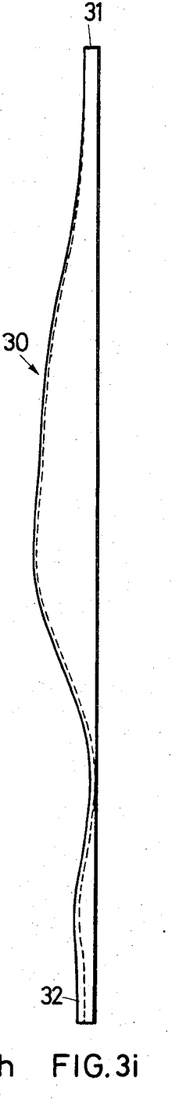
Figure 4A:
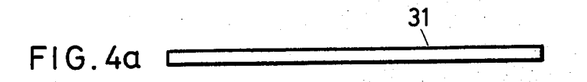
FIGS. 4a, 4b, 4c, 4d, 4e and 4f are sections taken along section line a—a, b—b, c—c, d—d, e—e, and f—f of FIG. 2, respectively.
Figure 4B:
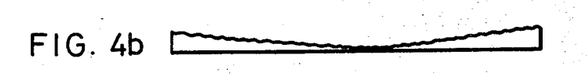
Figure 4C:
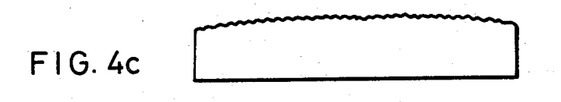
Figure 4D:
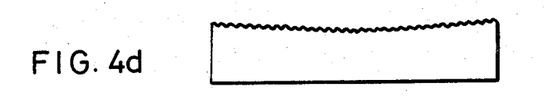
Figure 4E:
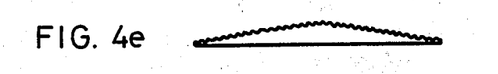
Figure 4F:
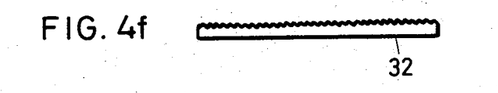

Referring first to FIGS. 2 to 4 showing contours of the fundamental guide surface of the bed according to the present invention, the guide bed 30 is made of rigid material and is generally curved along its surfaces. The bed is provided with an inlet end 31 and an outlet end 32 each disposed substantially perpendicular to the travel direction of the sheet material to be corrugated thereon. There are formed on the surface of the guide bed 30 a plurality of flutes having alternate ridges and grooves converging toward the outlet end 32 of the bed 30. The ridges and grooves of the flutes extending between the inlet and outlet ends of the bed are formed such that their amplitude becomes greater toward the outlet 32 while their period becomes smaller so that the flutes configurations at the outlet end may conform with those of the flutes to be formed in the sheet material.

The surface of the guide bed 30 containing the flutes is formed such that the longitudinal surface lengths of the sheet material measured with a certain surface distance from the longitudinal side edges of the bed and the transverse wavy surface lengths of the bed measured with a certain surface distance from the inlet 31 or outlet 32 of the bed are held substantially equal, respectively, in any portion of the bed in order to prevent localization of stresses in the sheet material during corrugating operation.

In order to obtain such surface conditions of the bed 30, a rectangular longitudinally corrugated paper sheet may be used, firstly fixing on a straight line one end of the corrugated sheet and gradually breaking the corrugations formed therein toward the other end so that the corrugations at the other end may be completely flattened, maintaining said other end straight which otherwise would tend to become arcuate. The half-broken corrugated sheet whose ends are held straight presents configurations similar to those of the bed as shown in FIGS. 2 to 4. Conversely speaking, in order to guide a sheet material with least possible local stresses on a gathering bed, it is necessary for the bed to have the surface configurations as shown in FIGS. 2 to 4. These figures show on a reduced scale of 1–5 the surface configurations as obtained by breaking 28 cm.×10⁸ cm. A-flute corrugated sheet, each of the contour lines in FIG. 2 showing height difference of 5 mm.

In order to guide sheet material firmly pressed against and gathered precisely along the contours of the guide surface as shown in FIGS. 2 to 4, it is necessary to employ suitable supplementary guide means which cooperate with the guide surface of the bed, though such means may be omitted in the preferred embodiment of the invention as will be discussed herein later. The sheet will be held firmly compressed against the bed surface by such means, for example, as rolls, belts, strings, wires, etc. Air may be blown onto the sheet material or suitable suction means may be provided in the bed surface. Otherwise, a second bed having surface conditions configured to coincide with those of the first guide bed may be located over the first bed with a suitable space for guiding and gathering the sheet therebetween.

Many other suitable pressure or supplementary guide means will readily occur to those skilled in the art to guide the sheet material suitably compressedly along the guide surface so that it may gradually acquire the ultimate fluted configurations. As mentioned above, the guide surface containing the ridges and grooves of the flutes is determined according to a configuration that the sheet would have on a gathering bed, there is substantially no possibility of the sheet material being torn while it is guided along gradually elevated ridges and deepened grooves of the bed.

Figure 5:
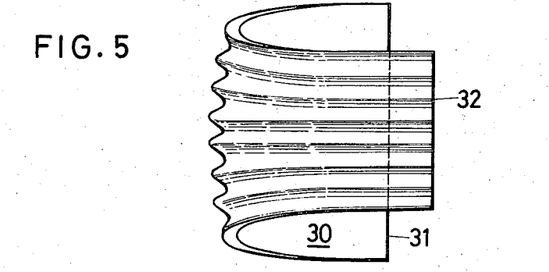
FIG. 5 is a plane view of a longitudinally curved guide bed.
Figure 6:
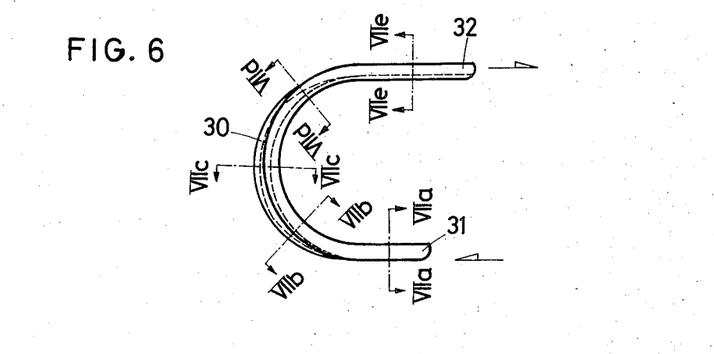
FIG. 6 is a side view of the bed in FIG. 5.
Figure 7:
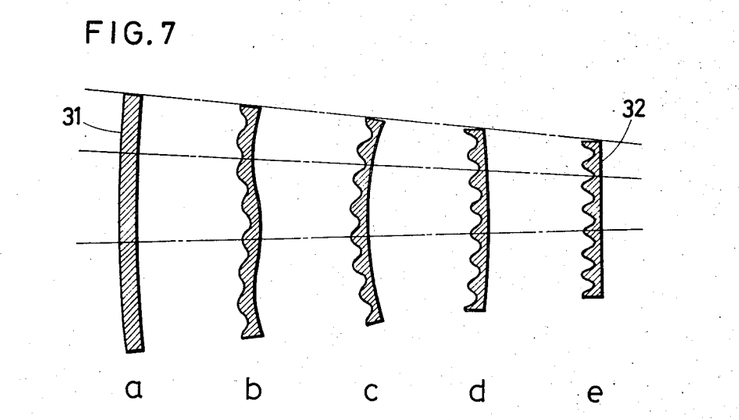
FIGS. 7a to 7e are sections of the bed in FIG. 5 taken along the section lines VIIa—VIIa, VIIb—VIIb, VIIc—VIIc, VIId—VIId and VIIe—VIIe of FIG. 5, respectively.

However, by forming the general bed structure into sectionally arcuate or saddle-like shape as shown in FIGS. 5 to 7, it is possible to maintain the sheet material by tension firmly against the guide surface of the bed. Such bed structure may be obtained by bending longitudinally the fundamental guide surface shown in FIGS. 2 to 4 and which structure is advantageous in that it contains less concave idle surfaces over which the sheet material will pass without contacting them when the sheet is drawn longitudinally over the guide surface of the bed. It has been found that the concave surface increases when the angles α and β become less than a predetermined value with the gathering rate $W'/W$ and the longuitudinal bed length $l$ held constant. If the bed is sufficiently bent longitudinally as shown in FIG. 5, the guide surface has substantially no irregular concave curvatures in longitudinal direction of the bed though it has in the transverse direction as shown specifically in FIG. 7b. However, as the sheet material is drawn longitudinally, it can enter into the grooves of the guide surface without trouble in spite of existence of such irregular curves in the transverse direction of the bed.

Figure 1:
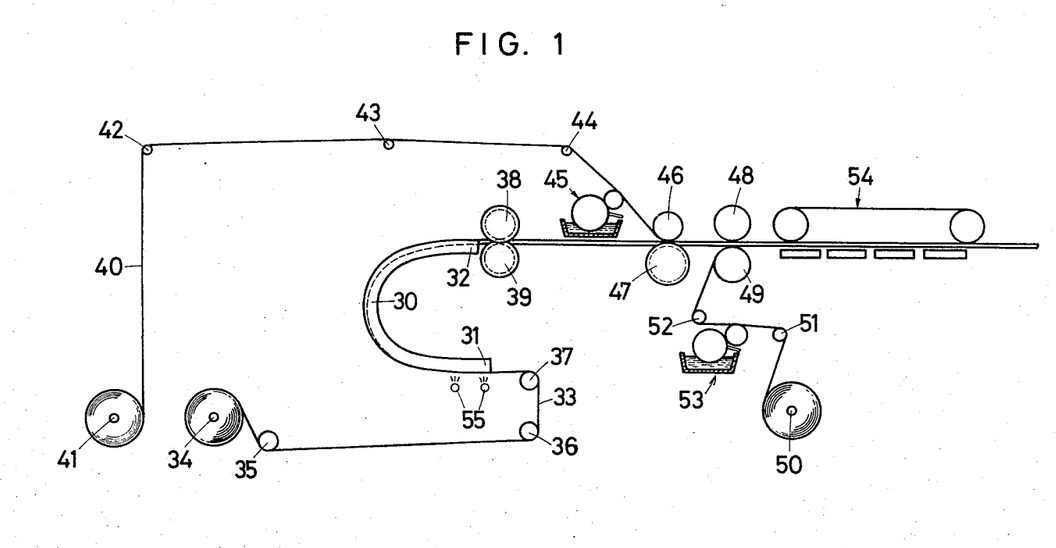
FIG. 1 is a diagrammatic side view of a machine for manufacturing corrugated paper boards, incorporating the guide or gathering bed according to the invention.

Referring now to FIG. 1 showing the U-shaped guide bed 30 of the invention employed as a gathering means in a machine for manufacturing corrugated paper board, the sheet material 33 to be corrugated is provided on a roll 34 mounted rotatably on suitable means. The paper sheet 33 from the roll 34 is passed over the guide rolls 35, 36 and 37 and is then introduced to the inlet end 31 of the bed mentioned herein before. The sheet material 33 is firmly held by tension against the guide surface of the bed and gradually acquires the configurations of the bed surface until it attains substantially the final configuration at the outlet end 32 of the bed. The fluted configuration of the sheet 33 is preferably regulated by a pair of regulator rolls 38 and 39 each grooved to conform with the final shape of the fluted material outcoming from the outlet end 32 of the bed 30.

The corrugated sheet material 33 is then provided on one side thereof with a liner sheet 40 which has been drawn from a roll 41 over guide rolls 42, 43 and 44 and has been laden with adhesive by suitable adhesive applicator assembly as indicated generally at 45. The two sheets are securely pressed together between rolls 46 and 47 of which roll 47 is grooved according to the flute configurations of the sheet material. Between rolls 48 and 49, the single face board thus obtained is then provided with another liner sheet drawn from roll 50 over idler guide rolls 51 and 52 and laden with adhesive by adhesive applicator assembly generally indicated by the reference numeral 53. As indicated at 55, the sheet 33 preferably is applied at the entrance 31 of the bed 30 with steam or any other suitable substance for enhancing the plasticity of the sheet or with resinous material which will help to set the sheet material more permanently in corrugated form.

The double face board passing off the rolls 48 and 49 advances to conventional drying section as generally indicated by the reefrence numeral 54.

Figure 17:
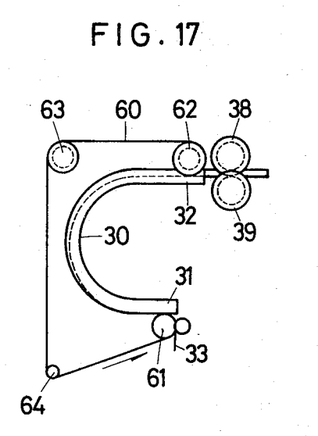
FIGS. 17 to 21 are diagrammatic side views showing different pressure means cooperating with the guide surface of the bed.

FIGS. 17 to 21 show examples of various pressure means which may be employed in combination with the bed having guide surface according to the instant invention, of which FIG. 17 shows an arrangement where a plurality of endless belts are utilized for holding the sheet material. The belts, of which 60 is representative, are passed over rolls 61 to 64 and run along the configurations of the grooves of the flutes formed on the bed. These belts may be substituted by an endless sheet of resilient material such as rubber extended between the inlet and outlet end of the bed, the rubber preferaly having a resiliency as high as to adapt itself to the surface configurations of the bed so that the corrugating material may securely follow the contours of the guide surfaces.

Figure 18:
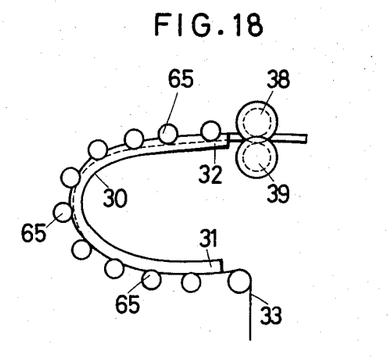
Figure 19:
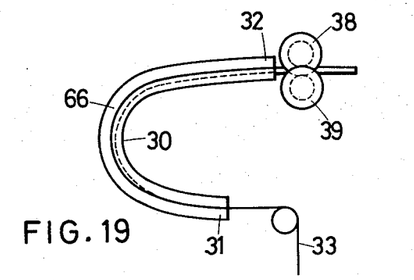
Figure 20:
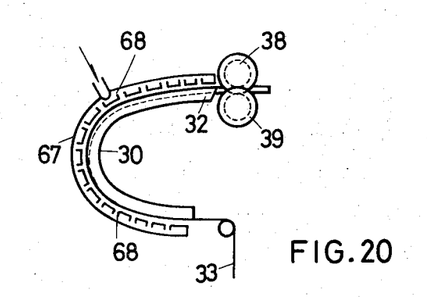

FIG. 18 shows a different sheet-holding arrangement wherein a plurality of rollers 65 are employed in place of the belts 60 mentioned with reference to FIG. 17, said rollers being rotatably supported on an axis extending transverse of the bed in a position suitable to cooperate with the guide surface. In FIG. 19 a second guide bed 66 having surface configurations corresponding to and coinciding with those of the first guide 30 is located over the first bed with a space suitable for passing and guiding the sheet material 33 therethrough. FIG. 20 shows a combination with an air blowing means 67 which is provided on the side facing with the guide bed with a plurality of air outlets 68 for blowing the sheet material 33 against the guide surface of the bed. The air may be moistened beforehand so as to increase the plasticity of the paper sheet 33.

Figure 21:
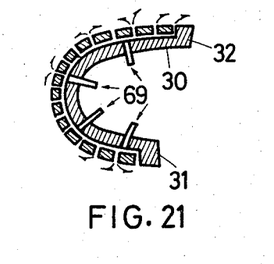

FIG. 21 shows an example wherein the bed 30 is provided with a plurality of air passages 69 for blowing therethrough compressed air fed from beneath in order to form an air film between the paper sheet and the guide surface thereby to lighten the abrasive contact therebetween.

Figure 8:
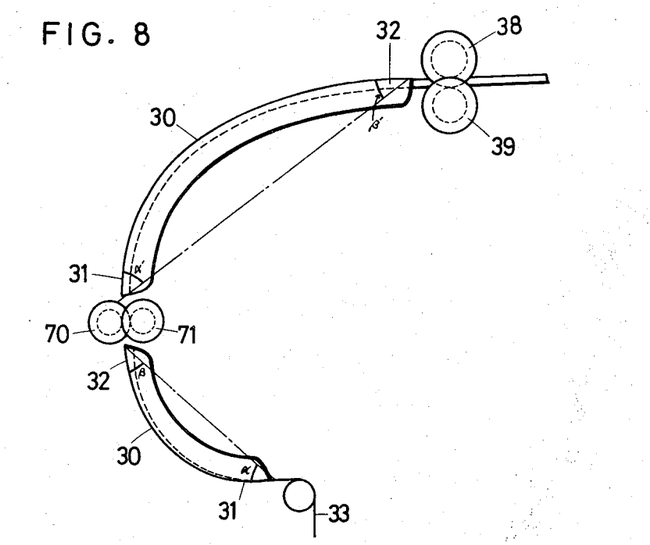
FIGS. 8 to 11 are schematic view explanatory of the different arrangements of the guide bed according to the present invention.
Figures 9, 10:
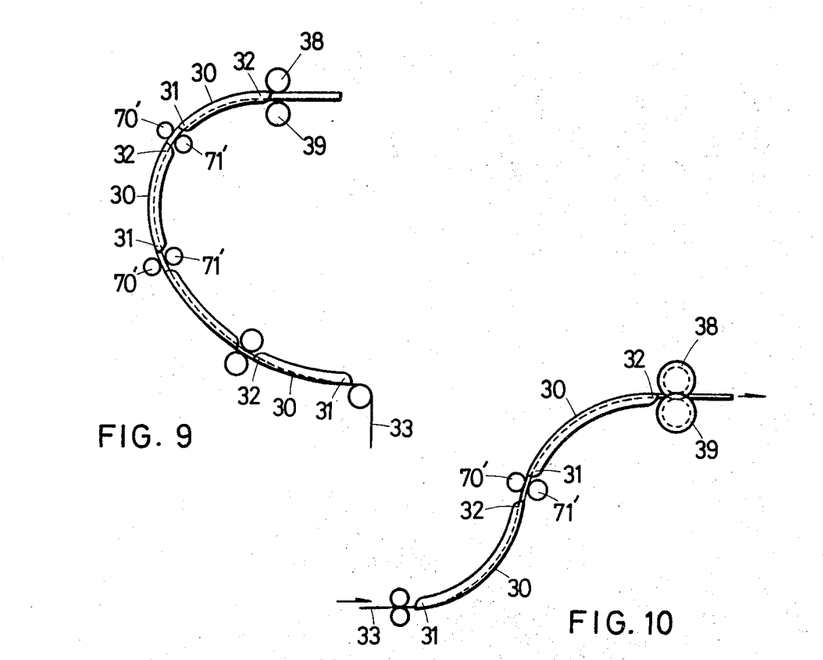
Figure 11:
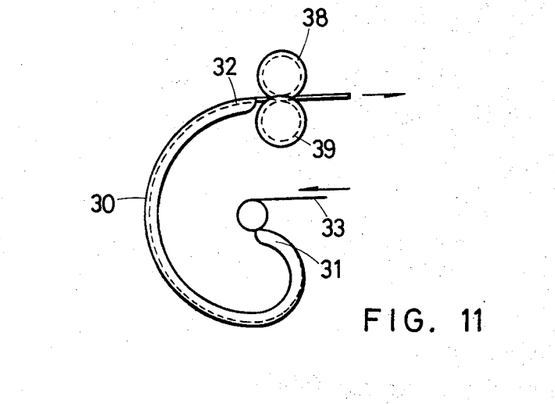
Figure 12:
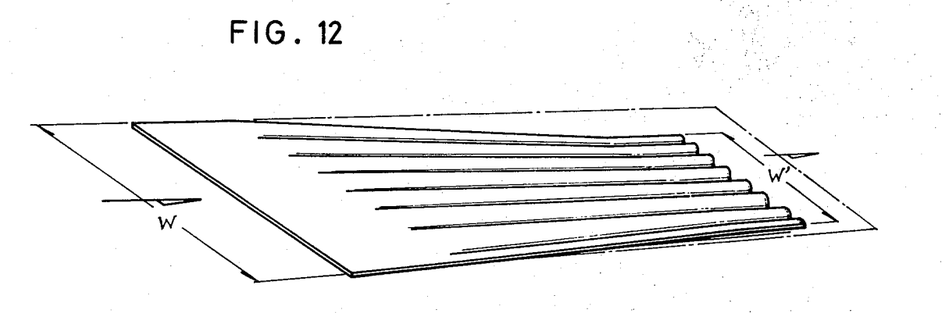
FIG. 12 is a perspective view of a half-fluted sheet, employed for the convenience of explanation.

FIGS. 8 to 10 show different arrangements of the guide bed according to the present invention, wherein the bed is employed in series. Interposed between two adjacent guide beds 30 are adjusting rollers 70 and 71 which are coupled with suitable driving means (not shown) and adapted for regulating the position and flute configurations of the sheet material therebetween. Rollers 70', 71' in FIGS. 9 and 10 are of idler type adapted for orientating the sheet material 33. The rolls 48 and 49 also serve to regulate the final flute configurations when the sheet has irregularly fluted portions. The body of the bed may be arranged in various forms depending upon the working space available, as shown in FIG. 11.

The guide bed 30 is maintained fixed and is constructed from rigid indeformable material. The guide surface of the bed may be coated with a substance to produce the least friction between the sheet material and the guide surface, depending upon the nature of the sheet material employed. Otherwise, such substance may be provided on that side of the sheet which contact the guide surface of the bed.

Figure 22:
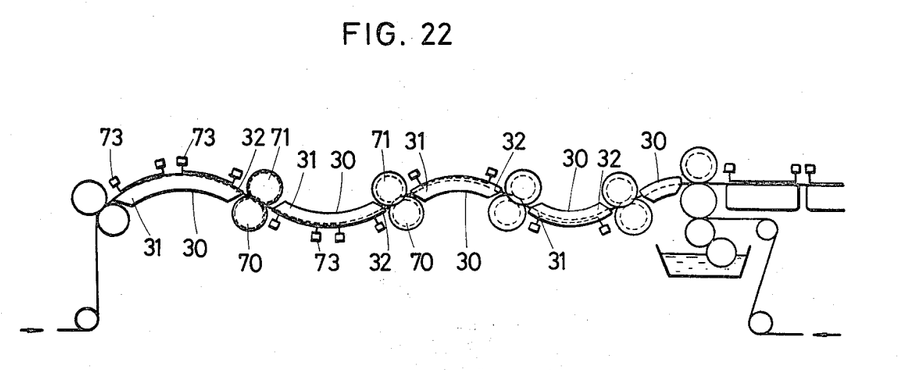
FIG. 22 is a schematic view showing a wavy bed arrangement, utilizing five beds disposed end to end horizontally on a wavy line.

FIG. 22 shows an arrangement where a plurality of beds are arranged to form horizontally a wavy line, the lengths of the beds becoming progressively shorter as the sheet 33 is gathered to smaller widths.

Figures 23, 24:
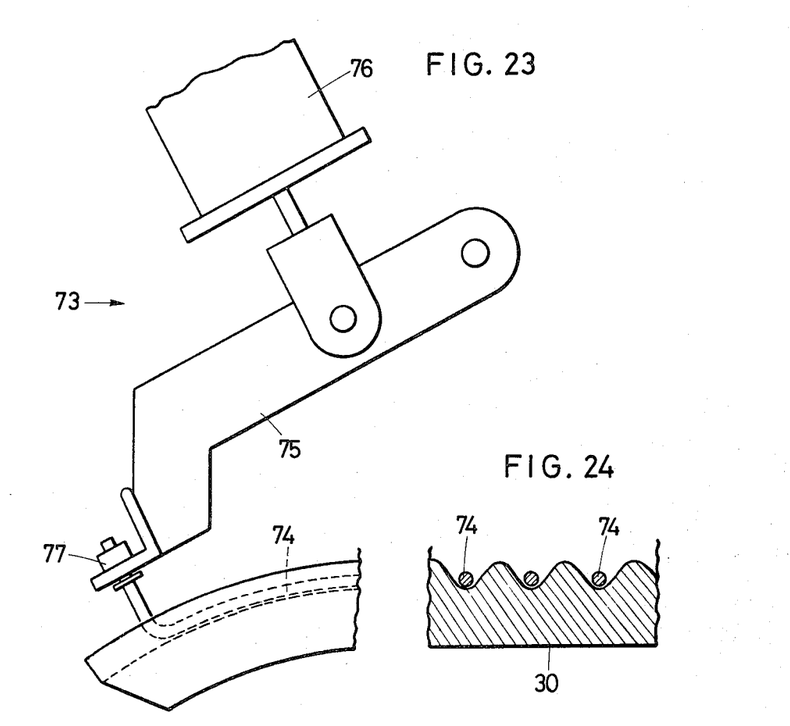
FIG. 23 is a schematic view on enlarged scale of the retaining means shown in FIG. 22.
FIG. 24 is a sectional view explanatory of the manner in which the retaining means hold sheet material against the grooves formed in the guide surface of the bed.

The sheet material 33 progressively acquires flute configurations greater in amplitude and smaller in period as it passes over the guide surface of each of the five bed sections. The sheet 33 is closely held against the bottom of grooves of the guide surface by thick wire or rod members 74 each extended between two pressure-biased retaining means 73 which is shown on enlarged scale in FIG. 23. The retaining means 73 have an arm 75 which is connected to suitable pressure means such as air cylinder shown at 76 in FIG. 23, the arm being provided at the fore end thereof with a wire retaining means 77. The manner in which the sheet is held against the bottom of the grooves will be clear from FIG. 24. This embodiment is suitable for gathering a sheet material with relatively large width.

Figure 13:
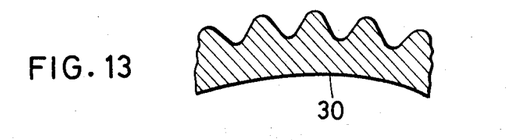
FIGS. 13 to 15 are views each showing a modified structure of the ridges of the flutes formed on the guide surface of the bed.
Figure 14:
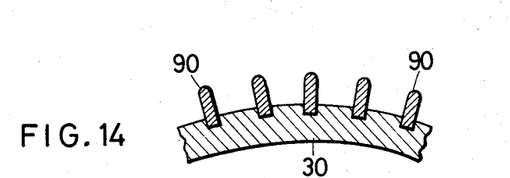
Figure 15:
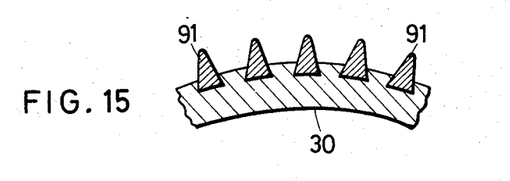

FIGS. 13 to 15 show different manners for forming the ridges of the flutes on the guide surface. FIG. 13 shows an example formed by molding and FIGS. 14 and 15 show ridges formed by strips 90 and 91 of different cross-sections each securely anchored in the guide surfaces of the bed.

Figure 16:
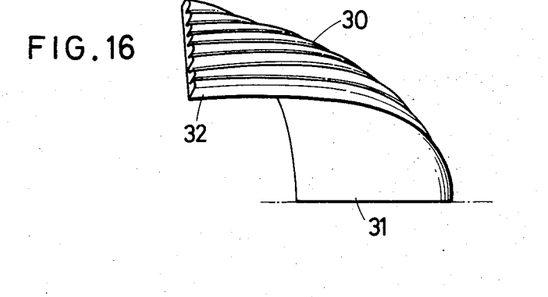
FIG. 16 is a schematic perspective view of a guide bed with displaced end arrangement.

FIG. 16 shows an example where the inlet and outlet ends are displaced 90 degrees from each other. However, this arrangement does not alter the position that the inlet and outlets are disposed perpendicular to the travel direction of the sheet material. Further, the inlet and outlet end 31 and 32 of the bed, may be curved transversely though they are illustrated rather flatwise in the accompanying drawings.

Figure 25:
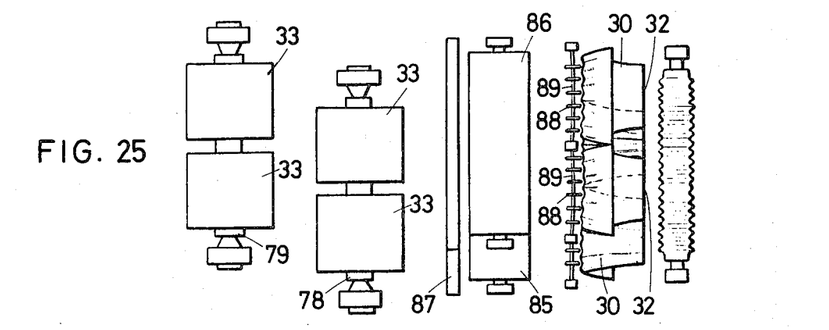
FIG. 25 is a diagrammatic plane view of a corrugating machine incorporating opposingly disposed two pairs of guide beds of the same construction.
Figure 26:
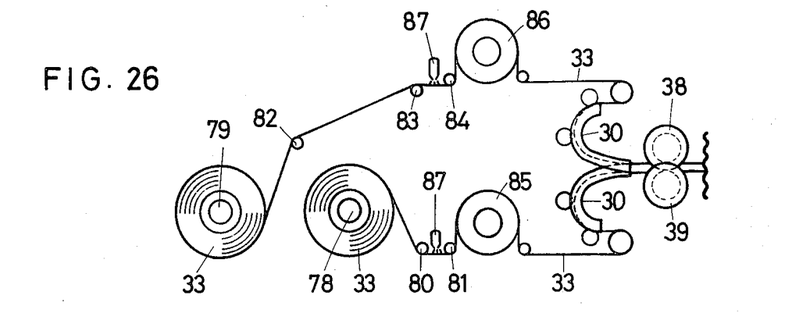
FIG. 26 is a diagrammatic side view of the machine in FIG. 25.

Referring now to FIGS. 25 and 26, there is shown diagrammatically a corrugating machine utilizing opposingly disposed two pairs of guide beds 30, each pair being provided side-by-side with their outlet ends 32 in alignment with each other. Paper sheets to be corrugated are provided on two roll shafts 78 and 79 each carrying two rolls of sheet material in juxtaposed position. The paper sheets are drawn by rolls 38 and 39 over guide idler rolls 80, 81 and 82 to 84, respectively, and then around the preheating rolls 85 and 86. Steam or any other material may be applied to the sheet as shown at 87 for plasticizing the sheet material 30. In this bed arrangement, a plurality of rotary elements 88 carried on a rod or wire 89 extending transversely of the bed are adapted for retaining the sheet material against the grooves of the bed. In place of the rotary elements, flexible rollers may be employed.

Figure 27:
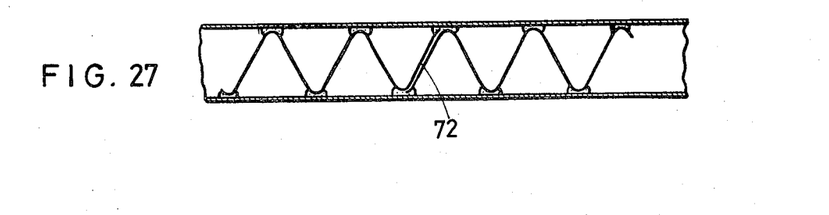
FIG. 27 is a sectional view of the composite paper board as obtained by the machine in FIGS. 25 and 26.

FIG. 27 shows a composite paper board manufactured by the machine in FIGS. 25 and 26, the interposed corrugated sheets being overlappingly connected as shown at 72.

Though sheet of paper material is particularly used for the convenience of explanation, it will be appreciated that other materials may be employed and that many other modifications and alterations will occur to those skilled in the art to the apparatus which are shown very diagrammatically.

What is claimed is:

1. In a machine for forming longitudinal corrugations in a web of sheet material, comprising a rigid, elongated and curved guide bed for gathering said sheet material and having an inlet and an outlet end disposed perpendicular to the direction of the sheet travel, a plurality of flutes extending between said outlet and inlet ends of the bed, said flutes converging toward said outlet end becoming progressively greater in amplitude and smaller in period, the configurations of the flutes at the outlet end of the bed corresponding substantially to ultimate flute configurations of said sheet material, the improvement wherein the surface of the bed containing said flutes is contoured such that all longitudinal lengths measured along the contoured surface of said bed and having each point therealong taken at equivalent distances from a side of said bed measured along the contoured surface thereof, and all transverse widths measured along the contoured surface of said bed and having each point therealong taken at equivalent distances measured along the contoured surface of said bed from an end thereof, are held substantially constant, respectively, in any portion of the bed.

2. A corrugating machine as defined in claim 1 wherein either the inlet or outlet end of the said guide bed is disposed flatwise on a plane transverse of the longitudinal plane of the bed.

3. A corrugating machine as defined in claim 1 wherein the guide surface of said bed is generally horizontally disposed.

4. A corrugating machine as defined in claim 1 wherein the guide surface of said bed is bent generally in arcuate form.

5. A corrugating machine as defined claim 1 incorporating a plurality of guide beds for forming corrugations simultaneously on plural guide surfaces.

6. A machine as defined in claim 1 wherein said ridges of the flutes are constituted by strips having either generally triangular or rectangular cross-section securely anchored in the guide surface of the bed.

7. A corrugating machine as defined in claim 6 wherein the plurality of guide beds are arranged end to end and are interposed by a pair of rolls adapted for guiding and regulating the fluted sheet material passing from the preceding guide surface.

8. A corrugating machine as defined in claim 6 wherein said plurality of guide beds are arranged side-by-side.

References Cited

UNITED STATES PATENTS

| | | | |
|---|---|---|---|
| 3,425,888 | 2/1969 | Kellicutt | 156—594 |
| 2,197,447 | 4/1940 | Cannard | 156—594 |
| 1,367,116 | 2/1921 | Boles | 156—594 |
| 2,655,978 | 10/1953 | Gonda et al. | 156—594 |

FOREIGN PATENTS

| | | | |
|---|---|---|---|
| 716,703 | 10/1954 | Great Britain | 156—594 |

BENJAMIN A. BORCHELT, Primary Examiner

J. V. DORAMUS, Assistant Examiner

UNITED STATES PATENT OFFICE
CERTIFICATE OF CORRECTION

Patent No. 3,692,615                    Dated September 19, 1972

Inventor(s)  KOICHIRO OHMORI

It is certified that error appears in the above-identified patent and that said Letters Patent are hereby corrected as shown below:

In the heading of the patent, after the name of the patentee, insert:

--assignor to Honshu Paper Company Limited,

Tokyo, Japan--

Signed and sealed this 13th day of March 1973.

(SEAL)
Attest:

EDWARD M. FLETCHER, JR.                 ROBERT GOTTSCHALK
Attesting Officer                       Commissioner of Patents

UNITED STATES PATENT OFFICE
CERTIFICATE OF CORRECTION

Patent No. 3,692,615                    Dated September 19, 1972

Inventor(s) KOICHIRO OHMORI

It is certified that error appears in the above-identified patent and that said Letters Patent are hereby corrected as shown below:

In the heading of the patent, insert:

--Claims priority, application Japan, March 12, 1969,

44/18,343--

Signed and sealed this 15th day of May 1973.

(SEAL)
Attest:

EDWARD M. FLETCHER, JR.
Attesting Officer

ROBERT GOTTSCHALK
Commissioner of Patents